(12) United States Patent
Edwards

(10) Patent No.: US 7,088,481 B2
(45) Date of Patent: Aug. 8, 2006

(54) HOLOGRAPHIC RECORDING TECHNIQUES USING REFERENCE ZONE OF SPATIAL LIGHT MODULATOR

(75) Inventor: Jathan D. Edwards, Afton, MN (US)

(73) Assignee: Imation Corp., Oakdale, MN (US)

( * ) Notice: Subject to any disclaimer, the term of this patent is extended or adjusted under 35 U.S.C. 154(b) by 118 days.

(21) Appl. No.: 10/775,500

(22) Filed: Feb. 10, 2004

(65) Prior Publication Data

US 2005/0174618 A1    Aug. 11, 2005

(51) Int. Cl.
*G03H 1/12* (2006.01)
(52) U.S. Cl. ............................. 359/11; 359/21; 359/35
(58) Field of Classification Search ............ 359/10–11, 359/21, 35, 29–31; 365/125, 216, 234
See application file for complete search history.

(56) References Cited

U.S. PATENT DOCUMENTS

| 4,104,489 | A | | 8/1978 | Satoh et al. | |
|---|---|---|---|---|---|
| 5,307,184 | A | * | 4/1994 | Nishiwaki et al. ............ | 359/30 |
| 5,719,691 | A | | 2/1998 | Curtis et al. | |
| 5,812,288 | A | | 9/1998 | Curtis et al. | |
| 5,838,650 | A | | 11/1998 | Campbell et al. | |
| 5,874,187 | A | | 2/1999 | Colvin et al. | |
| 5,917,798 | A | | 6/1999 | Horimai et al. | |
| 6,108,110 | A | * | 8/2000 | Orlov et al. .................. | 359/22 |
| 6,222,650 | B1 | * | 4/2001 | Long .............................. | 359/2 |
| 6,538,776 | B1 | * | 3/2003 | Edwards ....................... | 359/29 |
| 6,753,989 | B1 | * | 6/2004 | Holmes et al. ................. | 359/2 |
| 6,762,865 | B1 | * | 7/2004 | Edwards ....................... | 359/29 |
| 6,775,037 | B1 | * | 8/2004 | Lee .............................. | 359/35 |
| 2003/0039001 | A1 | * | 2/2003 | King et al. .................... | 359/35 |
| 2005/0200928 | A1 | * | 9/2005 | Mori et al. .................... | 359/22 |
| 2005/0243389 | A1 | * | 11/2005 | Kihara ........................... | 359/9 |
| 2006/0077853 | A1 | * | 4/2006 | Matsumoto et al. ......... | 369/103 |

FOREIGN PATENT DOCUMENTS

| EP | 1 624 451 A1 | | 2/2006 |
|---|---|---|---|
| EP | 1624451 | * | 2/2006 |

OTHER PUBLICATIONS

Psaltis et al., "Holographic storage using shift multiplexing," Optics Letters, vol. 20, No. 7, Apr. 1, 1995, pp. 782-784.

Pu et al., "High-density recording in photopolymer-based holographic three-dimensional disks," Applied Optics, vol. 35, No. 14, May 1996, pp. 2389-2398.

(Continued)

*Primary Examiner*—Leonidas Boutsikaris
(74) *Attorney, Agent, or Firm*—Eric D. Levinson

(57) ABSTRACT

The invention is directed to holographic recording techniques that generate a data encoded object beam and a reference beam using a spatial light modulator of the holographic recording system. An input light source, e.g., comprising laser light conditioned by optical elements, can be used to illuminate the spatial light modulator. Different portions of the spatial light modulator are used to create the data encoded object beam and the reference beam, which are then made to interfere in a holographic medium to record a hologram.

17 Claims, 9 Drawing Sheets

OTHER PUBLICATIONS

Barbastathis et al., "Shift multiplexing with spherical reference waves," Applied Optics, vol. 35, No. 14, May 1996, pp. 2403-2417.

Psaltis et al., "Holographic Data Storage," Computer IEEE, Feb. 1998, pp. 52-60.

Dhar et al., "Holographic storage of multiple high-capacity digital data pages in thick photopolymer system," Optics Letters, vol. 23, No. 21, Nov. 1, 1998, pp. 1710-1712.

Curtis et al., "High Density, High Performance Data Storage via Volume Holography: The Lucent Technologies Hardware Platform," Bell Laboratories, Lucent Technologies, pp. 1-9, published in 2000 by Holographic Data Storage, Ed. Coufal et al.

Ashley et al., "Holographic data storage," IBM J. Res Develop, vol. 44, No. 3, May 3, 2000, pp. 341-368.

* cited by examiner

HOLOGRAPHIC RECORDING TECHNIQUES USING REFERENCE ZONE OF SPATIAL LIGHT MODULATOR

TECHNICAL FIELD

The invention relates to holography and, more particularly, to holographic data storage.

BACKGROUND

Many different types of data storage media have been developed to store information. Traditional data storage media, for instance, include magnetic media, optical media, and mechanical media to name a few. Increasing data storage density is a paramount goal in the development of new or improved types of data storage media.

In traditional media, individual bits are stored as distinct mechanical, optical, or magnetic changes on the surface of the media. For this reason, medium surface area poses physical limits on data densities of traditional media.

Holographic data storage media can offer higher storage densities than traditional media. In a holographic medium, data is stored throughout the volume of the medium rather than the medium surface. Moreover, data can be superimposed within the same medium volume using any of a wide variety of holographic multiplexing techniques. For these reasons, theoretical holographic storage densities can approach tens of terabits per cubic centimeter.

In holographic data storage media, entire pages of information, e.g., bit maps, can be stored as optical interference patterns within a photosensitive optical material. This is done by intersecting two coherent laser beams within the optical material. The first laser beam, called the object beam, contains the information to be stored; and the second, called the reference beam, interferes with the object beam to create an interference pattern that can be stored in the holographic recording material as a hologram. In most conventional holographic recording systems, the object beam and reference beam follow separate optical paths.

When a stored hologram is illuminated with only the reference beam, some of the reference beam light is diffracted by the hologram interference pattern. Moreover, the diffracted light can reconstruct the original object beam. Thus, by illuminating a recorded hologram with the reference beam, the data encoded in the object beam can be reconstructed and detected by a data detector such as a camera.

SUMMARY

In general, the invention is directed to holographic recording techniques that generate a data encoded object beam and a reference beam using a spatial light modulator of a holographic recording system. An input light source, e.g., comprising laser light conditioned by optical elements, can be used to illuminate the spatial light modulator. Different portions of the spatial light modulator are used to create the data encoded object beam and the reference beam. The data encoded object beam and reference beam are then made to interfere in a holographic medium to record a hologram.

In one embodiment, the invention provides a method comprising creating a data encoded object beam from an input light source using a first controllable portion of a spatial light modulator, and creating a reference beam from the input light source using a second controllable portion of the spatial light modulator.

In another embodiment, the invention provides a spatial light modulator comprising a first set of controllable optical elements to create a data encoded object beam from an input light source and a second set of controllable optical elements to create a reference beam from the input light source.

In another embodiment, the invention provides a holographic data storage system comprising a holographic medium and a spatial light modulator. The spatial light modulator includes a first set of controllable optical elements to create a data encoded object beam from an input light source, and a second set of controllable optical elements to create a reference beam from the input light source.

In another embodiment, the invention provides a method comprising creating a data encoded object beam from an interior portion of an input light source using a spatial light modulator, and creating a reference beam from a perimeter portion of the input light source.

In another embodiment, the invention provides a spatial light modulator comprising a set of controllable optical elements to create a data encoded object beam from an interior portion of an input light source, and a perimeter reference zone positioned around the set of controllable optical elements to create a reference beam from a perimeter portion of the input light source.

In another embodiment, the invention provides a holographic data storage system comprising a holographic medium, and spatial light modulator. The spatial light modulator includes a set of controllable optical elements to create a data encoded object beam from an interior portion of an input light source, and a perimeter reference zone positioned around the set of controllable optical elements to create a reference beam from a perimeter portion of the input light source, wherein the data encoded object beam and reference beam interfere in the holographic medium to create a hologram.

In another embodiment, the invention provides a method comprising creating a data encoded object beam from a perimeter portion of an input light source using a spatial light modulator, and creating a reference beam from an interior portion of the input light source using the spatial light modulator.

In another embodiment, the invention provides a spatial light modulator comprising a set of controllable optical elements to create a data encoded object beam from a perimeter portion of an input light source, and an interior reference zone positioned inside the set of controllable optical elements to create a reference beam from an interior portion of the input light source.

In another embodiment, the invention provides a holographic data storage system comprising a holographic medium, and spatial light modulator including a set of controllable optical elements to create a data encoded object beam from a perimeter portion of an input light source, and an interior reference zone positioned inside the set of controllable optical elements to create a reference beam from an interior portion of the input light source, wherein the data encoded object beam and reference beam interfere in the holographic medium to create a hologram.

The different embodiments of the invention may provide one or more advantages. For example, in various embodiments of the invention, the object and reference beams follow substantially the same optical path, which can simplify the holographic recording system. In addition, some embodiments can provide phase selectivity in the reference beams, which can improve differentiation of overlapping holograms in a holographic recording medium, and possibly result in higher storage capacity in holographic media.

Moreover, in some embodiments, data encryption or security features can be incorporated into the optical characteristics of the reference beams, e.g., so that a reference beam signature would be needed to access the data.

Another advantage of the techniques described herein is the ability to provide for improved detection of stored holograms. For example, if the reference beam and object beam are created from different portions of the spatial light modulator, the reference beam and object beam can be viewed as respective portions of an SLM plane within the spatial light modulator. When a hologram image is reconstructed at the detector plane, this hologram image will substantially replicate the image that was encoded at the SLM plane during prerequisite recording of the hologram. Therefore, reference beam light intensity will not coincide or overlap with the reconstruction of the object beam in the detector plane. This can improve the ability to read holograms from holographic media by reducing or eliminating reference light contributions that might otherwise degrade the reconstructed object.

Various embodiments of the invention described herein may also have advantages over other embodiments described herein. For example, relative to a spatial light modulator that includes a first set of controllable optical elements to create a data encoded object beam and a second set of controllable optical elements to create a reference beam, the use of a fixed or non-controllable perimeter reference zone provides advantages in terms of reduced cost and simplicity in the holographic recording system. On the other hand, use of controllable optical elements to create a reference beam provides greater flexibility and improved ability for multiplexing relative to use of a non-controllable perimeter reference zone to create the reference beam.

Moreover, the invention may utilize an interior portion of the spatial light modulator for creation of the object beam, which may take advantage of a more uniform light intensity profile of an expanded laser beam characteristically exhibiting Gaussian light distribution, relative to the intensity on the perimeter reference zone. The uniform intensity light in the interior portion may be better suited for data encoding. Moreover, the size of the perimeter reference zone (or a controllable perimeter portion) relative to the controllable interior portion may be selected to achieve substantially equal intensities in the object and reference beams. For example, the perimeter reference zone (or controllable perimeter portion) may be larger in area than the controllable interior portion if uniform intensity light illuminates the controllable interior portion so that substantially equal intensities of light illuminate the perimeter reference zone and the controllable interior portion.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
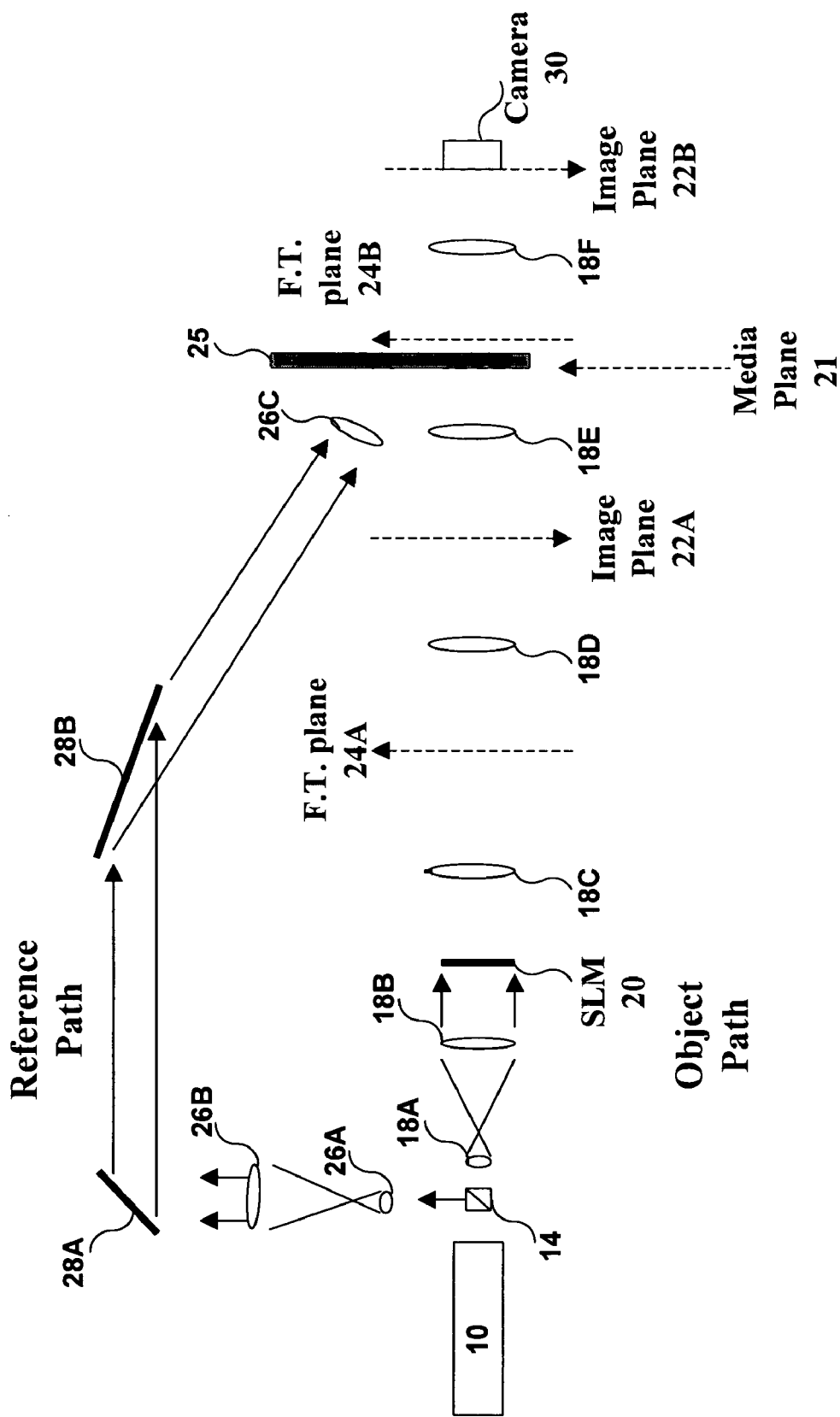
FIG. 1 illustrates a conventional optical arrangement for holographic recording.

The invention is directed to holographic recording techniques that generate a data encoded object beam and a reference beam using a spatial light modulator of a holographic recording system. An input light source, e.g., comprising laser light conditioned by optical elements, can be expanded to illuminate the spatial light modulator. Different portions of the spatial light modulator are used to create the data encoded object beam and the reference beam, which are then made to interfere in a holographic medium to record a hologram. Accordingly, the object and reference beams follow substantially the same optical path, which can simplify the holographic recording system.

As described herein, a spatial light modulator may include active elements and passive elements. In some cases, two different sets of active elements are used to create object and reference beams. In other cases, a set of active elements are used to create the object beam and one or more passive elements are used to create the reference beam. In the former case, the spatial light modulator includes only active elements, but in the later case, the spatial light modulator includes both active and passive elements. The active elements are generally referred to herein as "controllable optical elements," whereas the passive element or elements are generally referred to as a "non-controllable reference zone" or a "non-controllable optical element."

In one embodiment, a spatial light modulator includes a first set of controllable optical elements to create a data encoded object beam from an input light source and a second set of controllable optical elements to create a reference beam from the input light source. The first and second sets of controllable optical elements may comprise reflective optical elements or transmissive optical elements, depending on the optical arrangement used in the holographic recording system. In other words, the spatial light modulator (SLM) used to create both the object and reference beams may be a transmissive type SLM or reflective type SLM.

The first set of controllable optical elements may form an interior portion of the spatial light modulator and the second set of controllable optical elements may form a perimeter portion of the spatial light modulator. Alternatively, any respective portions of the spatial light modulator may be used to define the respective first and second sets of controllable optical elements. For example, the reference portion could alternatively reside in the interior portion, or the object and reference portions could reside side-by-side. However, using the interior portion for creating the data encoded object beam may provide certain advantages in the creation of holograms because expanded laser beams characteristically exhibit a Gaussian light distribution, resulting in more uniform light intensity in the interior portion.

An SLM controller can be used to control the first set of controllable optical elements in order to define a bit map in the data encoded object beam and to control the second set of controllable optical elements in order to define a reference mask in the reference beam. In some cases, multiplexing can be achieved by defining different reference beams for different data encoded object beams. In other words, different reference beam masks may be defined by the second set of optical elements for use in recording different holograms. In that case, the use of different reference beams may allow for multiplexing within a common volume of the medium with or without the additional use of shift multiplexing techniques, angle multiplexing techniques, wavelength multiplexing techniques, or the like. For example, the correlation between different reference beam masks used for two holograms stored in a common volume of the medium may be substantially different to allow for readout of the different holograms when the different holograms are illuminated by the respective reference beam associated with that hologram.

Alternatively, holograms associated with different data encoded object beams may use similar reference beams defined by the second set of controllable optical elements, with multiplexing being performed via shift multiplexing, angle multiplexing, wavelength multiplexing, or other multiplexing techniques. In other words, in some embodiments, the reference beams are similar for each of the different holograms stored in the medium. In any case, the use of a portion of the spatial light modulator to define the content of the reference beams provides flexibility in the creation of the reference beams. Accordingly, the reference beams can be made to be substantially similar for different holograms, or substantially different such that the optical characteristics of the reference beams allow for improved multiplexing.

In an alternative embodiment of the invention, a spatial light modulator includes a set of controllable optical elements to create a data encoded object beam from an interior portion of an input light source, and a perimeter reference zone positioned around the set of controllable optical elements to create a reference beam from a perimeter portion of the input light source. In this case, the perimeter reference zone may comprise a fixed reference mask that creates the reference beam. In other words, in this case, the perimeter reference zone is generally not controllable. The perimeter reference zone may optically manipulate or adjust one or more optical characteristics of the perimeter portion of the input light source, such as an amplitude pattern, a phase pattern, or a combination thereof to create the reference beams for the different holograms. In this embodiment, the reference beam used for different holograms would be substantially identical because the perimeter reference zone does not change. In an alternative configuration, the non-controllable reference zone could reside in the interior, with the controllable set of elements being located around the interior reference zone. The respective portions used to create the object and reference beams could also affect light polarization, e.g., to ensure that polarizations of the object and reference beams match.

The perimeter reference zone (or an interior reference zone) may comprise a non-controllable transmissive optical element or a non-controllable reflective optical element. In other words, the perimeter reference zone may be transmissive or reflective, depending on the optical arrangement used in the holographic recording system. Again, however, in this embodiment, the perimeter reference zone comprises one or more fixed or non-controllable elements that statically define the reference beam. Relative to a spatial light modulator that includes a first set of controllable optical elements to create a data encoded object beam and a second set of controllable optical elements to create a reference beam, the use of a fixed or non-controllable perimeter reference zone provides advantages in terms of reduced cost and simplicity in the holographic recording system. On the other hand, use of controllable optical elements to create a reference beam provides greater flexibility and improved ability for multiplexing relative to use of a non-controllable perimeter reference zone to create the reference beam.

The controllable interior portion may take advantage of a more uniform light intensity of an expanded laser beam characteristically exhibiting Gaussian light distribution, relative to the intensity on the perimeter reference zone. In particular, more uniform intensity light in the interior portion may be better suited for data encoding relative to light at the perimeter of the Gaussian light distribution. Moreover, the size of the perimeter reference zone of the spatial light modulator relative to the controllable interior portion may be selected to achieve substantially equal intensities in the object and reference beams. For example, the perimeter reference zone may be larger in area than the controllable interior portion if higher intensity light illuminates the controllable interior portion so that substantially equal intensities of light illuminate the perimeter reference zone and controllable interior portion.

FIG. 1 illustrates a conventional optical arrangement for holographic recording. As shown in FIG. 1, laser 10 produces laser light that is divided into two components by beam splitter 14. These two components which exit beam splitter 14 generally have an approximately equal intensity and may be spatially filtered to eliminate optical wave-front errors.

The first component exits beam splitter 14 and follows an object path. This "object beam" may then pass through a collection of object beam optical elements 18A–18E and a data encoder such as a spatial light modulator 20. For instance, lens 18A and lens 18B may form a laser beam expander to provide a collimated beam to spatial light modulator 20.

Spatial light modulator 20 encodes data in the object beam, for instance, in the form of a holographic bit map (or pixel array). The encoded object beam passes through lenses 18C, 18D, and 18E before illuminating a holographic recording media plane 21. In this "4F" configuration, lens 18C is located one focal length from spatial light modulator 20 and one focal length from Fourier transform plane 24A. Lens 18D is located one focal length from Fourier transform plane 24A and one focal length from image plane 22A. Lens 18E is located one focal length from image plane 22A and one focal length from Fourier transform plane 24B.

The second component exits the beam splitter 14 and follows a reference path that is different from the object path. This "reference beam" is directed by reference beam optical elements such as lenses 26A–26C and mirrors 28A–28B. The reference beam illuminates the holographic recording media plane 21, interfering with the object beam to create a hologram on medium 25. Again, however, in this conventional arrangement, the object beam and reference beam follow different optical paths.

By way of example, medium 25 may take the form of a disk or a card, or any other holographic media format. For example, medium 25 may have a sandwich construction in which a photosensitive material is sandwiched between two optically clear glass or plastic substrates. The holograms generally comprise a pixel array or bit map that is encoded in the object beam. The object beam and reference beam interfere in the photosensitive material of medium 25 to create the hologram.

When recording a hologram, storage medium 25 is typically located at or near one of the Fourier transform planes. Using this system, the data encoded in the object beam by spatial light modulator 20 is recorded in medium 25 by simultaneously illuminating both the object and the reference paths so that the object beam and reference beam interfere in the photosensitive material.

After a hologram has been stored on the medium 25, the data encoded in the hologram may be read by the system. For readout of the data, only the reference beam is allowed to illuminate the hologram on medium 25. Light diffracts off the hologram stored on medium 25 to reconstruct or "recreate," the object beam, or a beam of light that is substantially equivalent to the original encoded object beam. This reconstructed object beam passes through lens 18F permitting a reconstruction of the bit map that was encoded in the object beam to be observed at image plane 22B. Therefore, a data detector, such as camera 30 can be positioned at image plane 22B to read the data encoded in the hologram.

The holographic bit map encoded by spatial light modulator 20 may comprise one "page" of holographic data. For instance, the page may be an array of binary information that is stored in a particular location on the holographic medium as a hologram. By way of example, a typical page of holographic data may comprises a 1000 bit by 1000 bit pixel array that is stored in a few square millimeters of medium surface area. In other cases, however, any sized pixel array could be defined.

There are several complexities that make the optical arrangement illustrated in FIG. 1 difficult to implement in a commercially viable system. For instance, to record a suitable hologram, the two separate optical paths must maintain both precise relative angular registration and precise overlap in the media plane. Moreover, the requirement of two separate optical paths may impose size constraints for a holographic recording system. In addition, separate optical paths for the object and reference beams may mandate the use of additional optical elements 26A–26C, 28A–28B. Lenses 26A–26C, for instance, may add substantial cost to the system.

Figure 2:
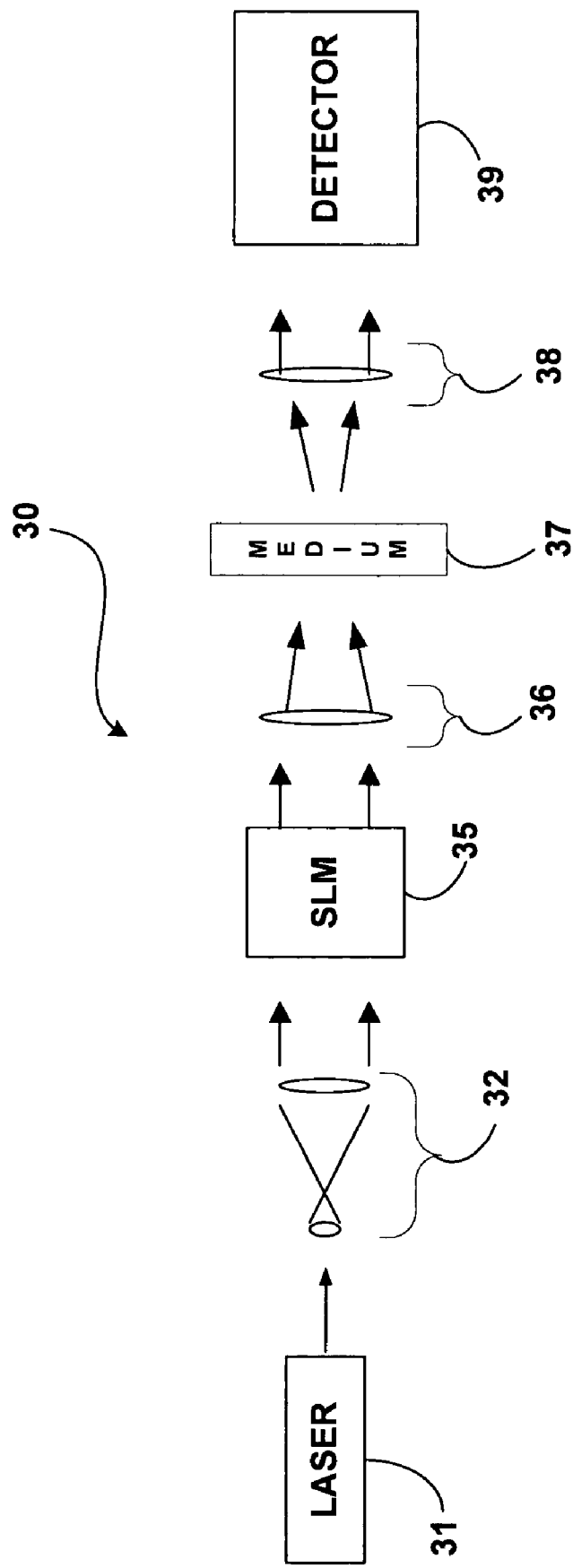
FIG. 2 illustrates a holographic system according to an embodiment of the invention that makes use of a transmissive spatial light modulator to both encode data on the object beam and create a reference beam.

FIG. 2 illustrates a holographic system 30 according to an embodiment of the invention that makes use of a transmissive spatial light modulator 35 to both encode data on the object beam and create a reference beam. System 30 includes a laser 31 to provide an input light source to system 30. One or more optical elements 32 can be used to condition the light from laser 31 in order to illuminate spatial light modulator 35.

In accordance with the invention, spatial light modulator 35 creates both a data encoded object beam and a reference beam from the input light. In particular, two distinct embodiments are described in greater detail below for spatial light modulator 35. In one case, spatial light modulator 35 includes a first set of controllable optical elements to create a data encoded object beam from an input light source and a second set of controllable optical elements to create a reference beam from the input light source. A control unit of spatial light modulator 35 can be used to control the first set of controllable optical elements in order to define a bit map in the data encoded object beam and to control the second set of controllable optical elements in order to define a reference mask in the reference beam.

In the other case, spatial light modulator 35 includes a set of controllable optical elements to create a data encoded object beam from an interior portion of an input light source, and a perimeter reference zone positioned around the set of controllable optical elements to create a reference beam from a perimeter portion of the input light source. In that case, the perimeter reference zone may comprise a fixed reference mask that creates the reference beam.

The different embodiments of spatial light modulator 35 described herein may provide advantages relative to each other. In particular, the use of a fixed or non-controllable perimeter reference zone provides advantages in terms of reduced cost and simplicity in the holographic recording system. On the other hand, use of controllable optical elements to create a reference beam provides greater flexibility and improved ability for multiplexing relative to use of a non-controllable perimeter reference zone to create the reference beam.

In system 30, the object and reference beams follow substantially the same optical paths, which can greatly simplify the holographic system 30. The object and reference beams exit spatial light modulator 35 and are made to interfere in a holographic medium 37 to record a hologram. One or more optical elements 36 can be used to condition the object and reference beams so that the beams properly interfere in medium 37. Medium 37 may take the form of a disk or a card, or any other holographic media format. For example, medium 37 may have a sandwich construction in which a photosensitive material is sandwiched between two optically clear glass or plastic substrates.

In one example, system 30 makes use of a 4F configuration in optical elements 36 and 38, each comprising Fourier transform lenses of a defined focal length. In that case, spatial light modulator 35 and optical elements 36 are separated by one focal length, optical elements 36 and medium 37 are separated by one focal length, medium 37 and optical elements 38 are separated by one focal length, and optical elements 38 and detector 39 are separated by one focal length. The medium plane comprises a Fourier transform plane in which the object and reference beams are transformed into the frequency domain. In that case, Fourier transform holograms are stored in medium 37.

In general, the physical separation of the various components of system 30 may be dependent on focal lengths associated with optical elements 32 and 36. A wide variety of optical arrangements, however, could be used. For example, optical arrangements could be defined so that the holograms comprise Fourier transform holograms, image plane holograms, Fresnel holograms, van der Lugt holograms, or any other type of hologram that can store the data encoded in the object beam by spatial light modulator 35.

In order to read stored holograms, spatial light modulator 35 is controlled to substantially block the light through the object path. In other words, the elements of spatial light modulator 35 which are used to create a data encoded object beam are made to be non-transmissive to block substantially all light from the object path. Accordingly, in that case, only the reference beam exits spatial light modulator 35 to illuminate medium 37. In one example, non-transmissive elements are reflective. In any case, when a stored hologram on medium 37 is illuminated by the reference beam only for that given hologram, a reconstruction of the data encoded object beam is created and can be detected by detector 39. For example, detector 39 may comprise a camera. One or more optical elements 38 may be used to condition the reconstructed object beam for proper illumination of the encoded pixel array onto detector 39.

If desired, another laser (not shown) may provide a probe beam of different wavelength from laser 71. In that case, the probe beam may be used for tracking of stored hologram. A tracking pattern that affects the transmission or reflection of the probe beam, for example, may be replicated on substrates of medium 37 or stored as tracking holograms in medium 37.

Figure 3:
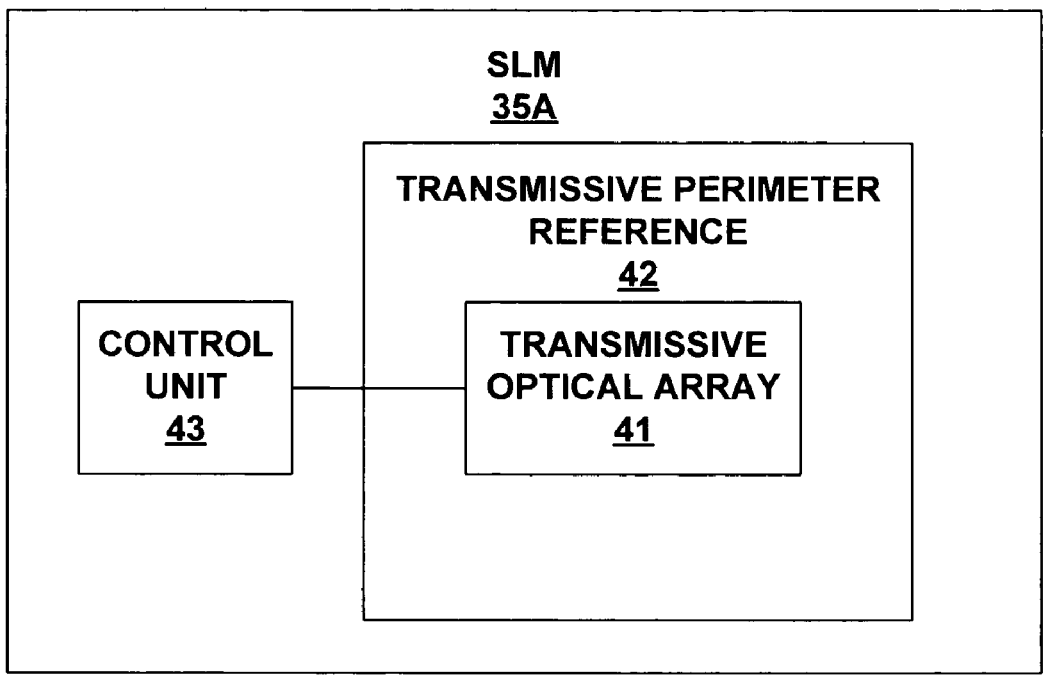
FIG. 3 is a block diagram of a spatial light modulator, which may correspond to the spatial light modulator illustrated in FIG. 2.

FIG. 3 is a block diagram of a spatial light modulator 35A, which may correspond to spatial light modulator 35 of FIG. 2. In this case, spatial light modulator 35A includes a first transmissive optical array 41, a transmissive perimeter reference zone 42, and a control unit 43 to control the individual elements of transmissive optical array 41. Transmissive optical array 41 may include a set of controllable optical elements to create a data encoded object beam from an interior portion of an input light source. Control unit 43 comprises a typical SLM controller to control the set of controllable optical elements to define a desired pixel array to be stored as a hologram. Moreover, for readout of stored holograms, control unit 43 controls set of controllable optical elements to block light through the object path so that only the reference beam exits spatial light modulator 35A.

Figure 4:
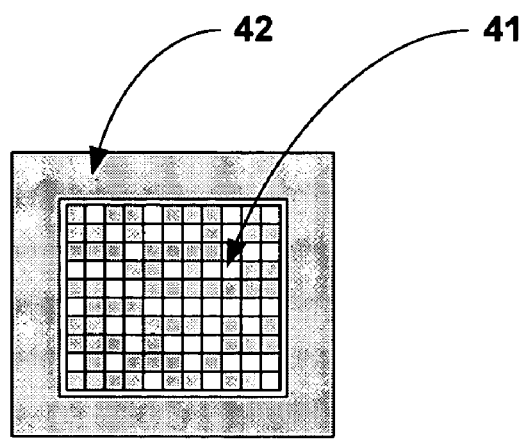
FIG. 4 is a simplified conceptual view of a transmissive optical array and a transmissive perimeter reference zone of the spatial light modulator illustrated in FIG. 3.

FIG. 4 is a simplified conceptual view of transmissive optical array 41 and a transmissive perimeter reference zone 42. Again, transmissive optical array 41 includes a set of controllable optical elements, which can be selectively controlled to pass or block light from the input light source in order to define a pixel array, which represents encoded data. By way of example, the pixel array may be a 1000×1000 bit array of pixels, although the invention could be applied with arrays of any size.

Perimeter reference zone 42 is positioned around the set of controllable optical elements of transmissive optical array 41. Perimeter reference zone 42 creates a reference beam from a perimeter portion of the input light source. The perimeter reference zone may comprise a fixed reference mask that creates the reference beam, and may define a unique output that may provide for data encryption in the stored holograms. In creating the reference beam, perimeter reference zone 42 may optically adjust one or more optical characteristics of the perimeter portion of the input light source, such as an amplitude pattern, a phase pattern, or combinations thereof.

Perimeter reference zone 42 may comprise one or more fixed transmissive optical elements. In other words, perimeter reference zone 42 comprises one or more non-controllable elements that statically define the reference beam. For example, perimeter reference zone 42 may comprise a replicated structure, a coated structure or any other structure to optically define a reference beam having some type of signature. The signature of the reference beam must be substantially duplicated to facilitate readout. Such a perimeter reference zone 42 may be fabricated using mastering and stamping techniques common to optical disk manufacturing, such that numerous similar perimeter reference zones can be created the same for use in different holographic systems. In that case, holographic media may be read by different systems. Alternatively, the perimeter reference zone 42 may define a unique pattern such that only a particular system can read its holographic media. In that case, perimeter reference zone 42 can be viewed as a mask that encodes the holograms for improved data security.

The use of a fixed or non-controllable perimeter reference zone 42 provides advantages in terms of reduced cost and simplicity in holographic recording system 30. Transmissive optical array 41 may take advantage of more uniform light intensity of an expanded laser beam characteristically exhibiting Gaussian light distribution, relative to the intensity on perimeter reference zone 42. In particular, more uniform intensity light in the interior portion may be better suited for data encoding relative to light at the perimeter of the Gaussian light distribution.

In addition, the size of perimeter reference zone 42 relative to the size of transmissive optical array 41 may be selected to achieve substantially equal intensities in the object and reference beams. For example, perimeter reference zone 42 may be larger in area than the set of controllable elements that make up transmissive optical array 42 so that substantially equal intensities of light illuminate the perimeter reference zone and controllable interior portion when Gaussian light distribution illuminates spatial light modulator 35A.

Figure 5:
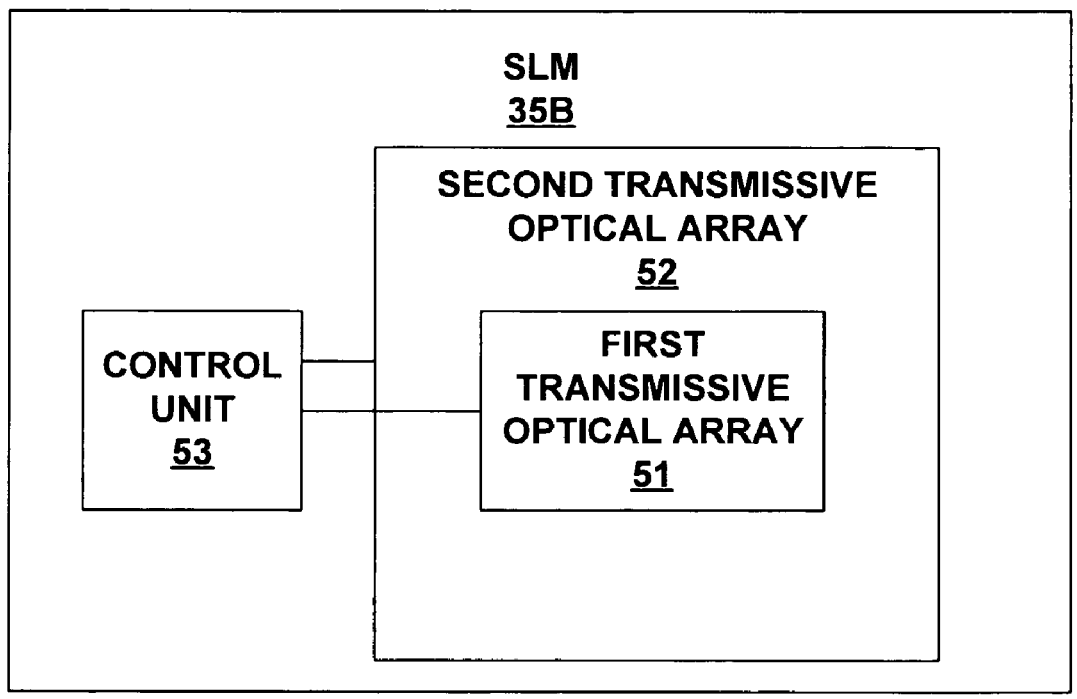
FIG. 5 is a block diagram of another spatial light modulator, which may correspond to the spatial light modulator illustrated in FIG. 2.

FIG. 5 is a block diagram of a spatial light modulator 35B, which may correspond to spatial light modulator 35 of FIG. 2. In this case, spatial light modulator 35B includes a first transmissive optical array 51, a second transmissive optical array 52, and a control unit 53 to control the individual elements of first and second transmissive optical arrays 51, 52. First transmissive optical array 51 includes a first set of controllable optical elements to create a data encoded object beam from a first controllable portion of an input light source. Second transmissive optical array 52 includes a second set of controllable optical elements to create a reference beam from a second controllable portion of an input light source. Control unit 53 comprises a typical SLM controller, but controls both sets of controllable optical elements to define a desired pixel array to be stored as a hologram and the reference beam to be used. In other words, control unit 53 controls both first and second transmissive optical arrays 51, 52.

The first set of controllable optical elements which form first transmissive optical array 51 may form an interior portion of spatial light modulator 35B and the second set of controllable optical elements which form second transmissive optical array 52 may form a perimeter portion of spatial light modulator 35B. Alternatively, any respective portions of spatial light modulator 35B may be used to define the first and second transmissive optical arrays 51, 52. For example, the locations of first and second transmissive optical arrays 51, 52 could be reversed, or first and second transmissive optical arrays 51, 52 could reside side-by-side. However, as mentioned above, use of the interior portion for creating of the data encoded object beam may provide certain advantages in the creation of holograms because an expanded laser beam characteristically exhibiting Gaussian light distribution results in more uniform light intensity in the interior portion. For readout of stored holograms, control unit 53 controls first and second transmissive optical arrays 51, 52 to define a desired reference beam and to block light through the object path so that only the reference beam exits spatial light modulator 35B.

Figure 6:
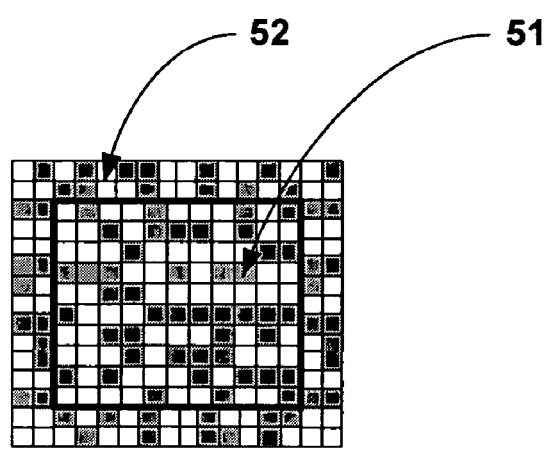
FIG. 6 is a simplified conceptual view of a first transmissive optical array and a second transmissive optical array of the spatial light modulator illustrated in FIG. 5.

FIG. 6 is a simplified conceptual view of a first transmissive optical array 51 and a second transmissive optical array 52. Both first and second transmissive optical arrays 51 and 52 are controllable. First transmissive optical array 51 defines the data encoded object beam, and second transmissive optical array defines a reference beam. By controlling the optical elements of first transmissive optical array 51, a bit map can be defined, and by controlling the optical elements of second transmissive optical array 52, a reference beam can be defined for the bit map. The pixel arrays for both the object and reference beams may include thousands or millions of pixels, although the invention could be applied with arrays of any size. For simplicity, the illustrated arrays 51, 52 include a small subset of the thousands or millions of elements that would be included in a real system.

In this example, the first set of controllable optical elements which form first transmissive optical array 51, form an interior portion of spatial light modulator 35B, and the second set of controllable optical elements which form second transmissive optical array 52 form a perimeter portion of spatial light modulator 35B. However, in other embodiments, any respective portions of spatial light modulator 35B may be used to define the first and second transmissive optical arrays 51, 52.

First transmissive optical array 51 creates a data encoded object beam from a first portion of the input light source. In other words, the optical elements of first transmissive optical array 51 are collectively defined such that some elements transmit light and other elements block light. In this manner, a pixel array or bit map is encoded in an object beam.

Second transmissive optical array 52 creates a reference beam from a second portion of the input light source. In other words, the optical elements of second transmissive optical array 52 are collectively defined such that some elements transmit light and other elements block light. In this manner, a reference mask is encoded in the reference beam. Accordingly, different reference beams can be created for different object beams such that different holograms have different reference beams. This can improve the ability to multiplex holograms, and in some cases allows for two or more holograms to be recorded in substantially the same volume of a medium.

Readout of the different holograms would be performed by illumination of the same medium with the various different reference beams at corresponding locations where respective holograms were recorded using such reference beams. The reference beams of different holograms recording in a given volume of the medium may be substantially non-correlated. Substantial non-correlation between different reference beams helps multiplexing by ensuring that two or more holograms can be recorded in substantially the same volume of a medium. Other multiplexing techniques, however, could be used in conjunction with the creation of non-correlated reference beams, e.g., angle multiplexing, shift multiplexing, wavelength multiplexing techniques, or the like.

Figure 7:
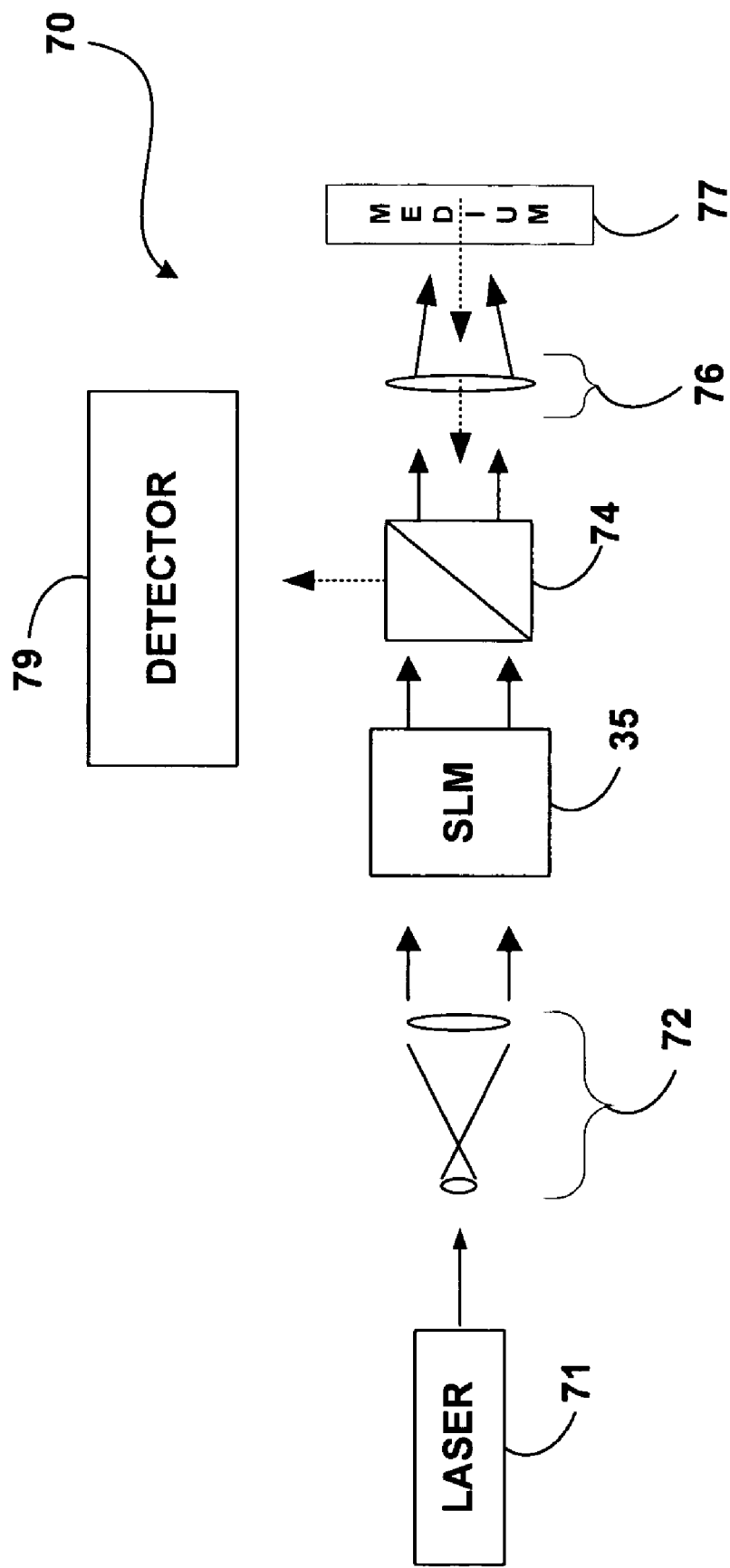
FIG. 7 illustrates another holographic system according to an embodiment of the invention that makes use of a transmissive spatial light modulator to both encode data on the object beam and create a reference beam.

FIG. 7 illustrates another holographic system 70 according to an embodiment of the invention that makes use of a transmissive spatial light modulator 35 to both encode data on the object beam and create a reference beam. Spatial light modulator 35 of FIG. 7 may correspond to either spatial light modulator 35A or spatial light modulator 35B described above with reference to FIGS. 3–6.

System 70 includes a laser 71 to provide an input light source to system 70. One or more optical elements 72 can be used to condition the light from laser 71 in order to illuminate spatial light modulator 35. In accordance with the invention, spatial light modulator 35 creates both a data encoded object beam and a reference beam from the input light. In particular, either of the distinct embodiments described herein may be used. In one case, spatial light modulator 35 includes a first set of controllable optical elements to create a data encoded object beam from an input light source and a second set of controllable optical elements to create a reference beam from the input light source. A control unit of spatial light modulator 35 can be used to control the first set of controllable optical elements in order to define a bit map in the data encoded object beam and to control the second set of controllable optical elements in order to define a reference mask in the reference beam.

In the other case, spatial light modulator 35 includes a set of controllable optical elements to create a data encoded object beam from an interior portion of an input light source, and a perimeter reference zone positioned around the set of controllable optical elements to create a reference beam from a perimeter portion of the input light source. In that case, the perimeter reference zone may comprise a fixed reference mask that creates the reference beam.

Again, the different embodiments of spatial light modulator 35 described herein may provide advantages relative to each other. In particular, the use of a fixed or non-controllable perimeter reference zone provides advantages in terms of reduced cost and simplicity in the holographic recording system. On the other hand, use of controllable optical elements to create a reference beam provides greater flexibility and improved ability for multiplexing relative to use of a non-controllable perimeter reference zone to create the reference beam.

In system 70, the object and reference beams follow substantially the same optical paths, which can greatly simplify the holographic system 70. The object and reference beams exit spatial light modulator 35 and pass through beam splitter 74 before interfering in a holographic medium 77 to record a hologram. One or more optical elements 76 can be used to condition the object and reference beams so that the beams properly interfere in medium 77. Medium 77 may take the form of a disk or a card, or any other holographic media format. For example, medium 77 may have a sandwich construction in which a photosensitive material is sandwiched between optically clear and optically reflective substrates.

In this example, medium 77 is a reflective holographic medium. During readout, medium 77 is illuminated by the reference beam only. Spatial light modulator 35 can be controlled so that only the reference beam is transmitted to illuminate medium 77. The reference beam creates a reconstruction of the original data encoded object beam, which is reflected back through optical elements 76 and beam splitter 74. Detector 79, such as a camera, is positioned to detect the reconstructed bit map in the reconstructed object beam.

Like system 30 of FIG. 3, the physical separation of the various components of system 70 may be dependent on focal lengths associated with optical elements 72 and 76. For example, a 4F configuration, or a wide variety of other optical arrangements, could also be used. In particular, optical arrangements could be defined so that the holograms comprise Fourier transform holograms, image plane holograms, Fresnel holograms, van de Lugt holograms, or any other type of holograms that can store the data encoded in the object beam by spatial light modulator 35.

In any case, spatial light modulator 35 facilitates creation of both the object and reference beams. In particular, different portions of spatial light modulator 35 are used to create the data encoded object beam and the reference beam, which are then made to interfere in a holographic medium to record a hologram. Accordingly, the object and reference beams follow substantially the same optical path, which can simplify the holographic recording system. In some cases, the reference beam is created by controllable elements which provides more flexibility to system 70 in terms of creation of the different reference beams. In other cases, the reference beam is created by a non-controllable perimeter reference zone which adds simplicity to system 70 and may reduce production costs associated with system 70.

Figure 8:
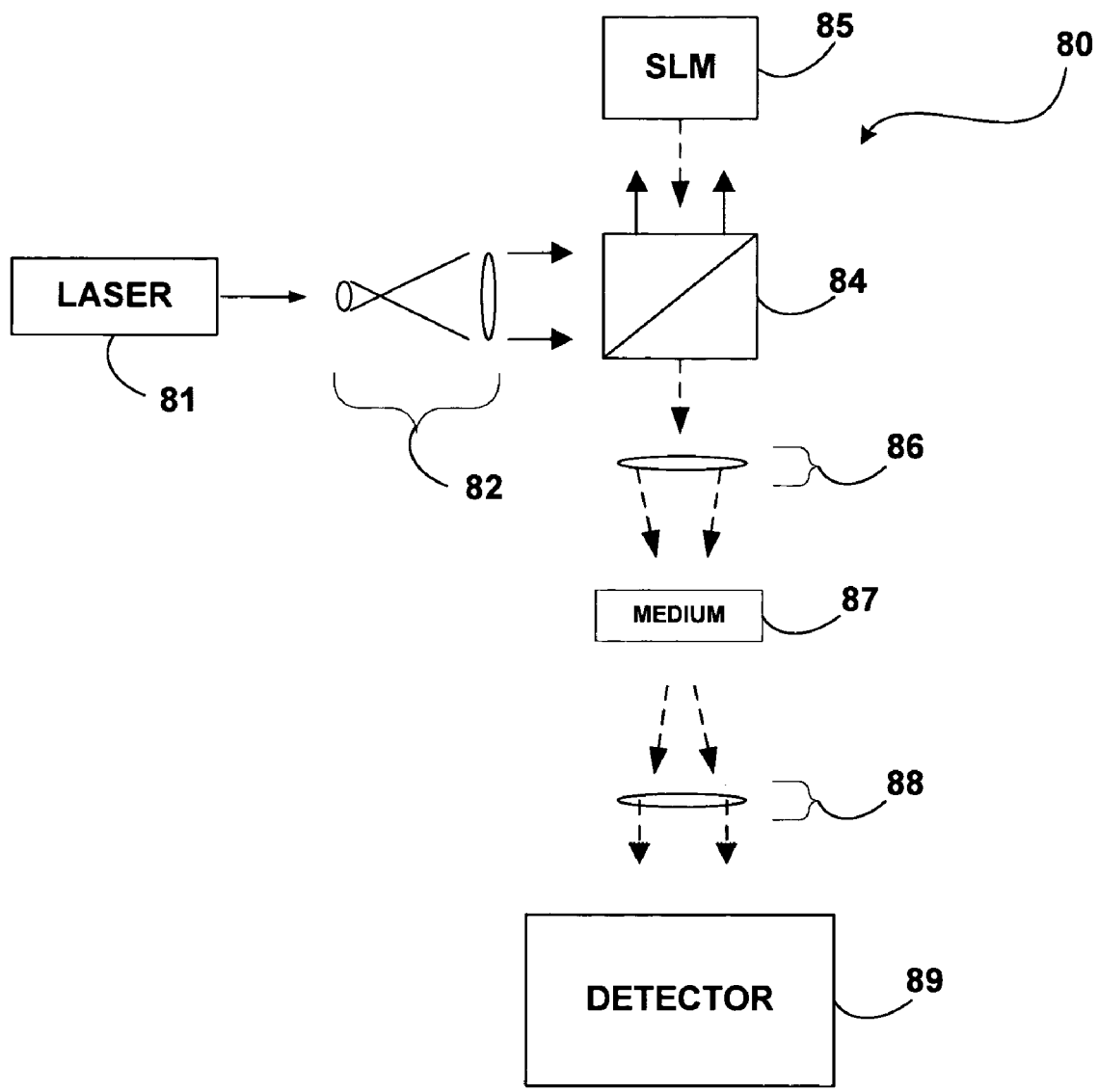
FIG. 8 illustrates another holographic system according to an embodiment of the invention that makes use of a reflective spatial light modulator to both encode data on the object beam and create a reference beam.

FIG. 8 illustrates another holographic system 80 according to an embodiment of the invention. In this example, system 80 makes use of a reflective spatial light modulator 85 to both encode data on the object beam and create a reference beam. Spatial light modulator 85 of FIG. 8 is very similar to spatial light modulators 35A and 35B described above with reference to FIGS. 3–6. However, in spatial light modulator 85, the optical elements used to create the object and reference beams are reflective elements rather than transmissive elements.

System 80 includes a laser 81 to provide an input light source to system 80. One or more optical elements 82 can be used to condition the light from laser 81 in order to illuminate spatial light modulator 85. Light from laser 81 and conditioned by elements 82 is reflected to spatial light modulator 85 by beam splitter 84.

In accordance with the invention, spatial light modulator 85 creates both a data encoded object beam and a reference beam from the input light. Like the transmissive embodiments described above, two distinct reflective embodiments are described in greater detail below for spatial light modulator 85. In one case, spatial light modulator 85 includes a first set of controllable reflective optical elements to create a data encoded object beam from an input light source and a second set of controllable reflective optical elements to create a reference beam from the input light source. A control unit of spatial light modulator 85 can be used to control the first set of controllable reflective optical elements in order to define a bit map in the data encoded object beam and to control the second set of controllable reflective optical elements in order to define a reference mask in the reference beam.

In the second case, spatial light modulator 85 includes a set of controllable reflective optical elements to create a data encoded object beam from an interior portion of an input light source, and a perimeter reference zone positioned around the set of controllable optical elements to create a reference beam from a perimeter portion of the input light source. In that case, the perimeter reference zone may comprise a fixed reflective reference mask that creates the reference beam.

Like the transmissive examples, the different reflective embodiments of spatial light modulator 85 described herein may provide advantages relative to each other. In particular, the use of a fixed or non-controllable reflective perimeter reference zone provides advantages in terms of reduced cost and simplicity in the holographic recording system. On the other hand, use of controllable reflective optical elements to create a reference beam provides greater flexibility and improved ability for multiplexing relative to use of a non-controllable perimeter reference zone to create the reference beam.

In system 80, the object and reference beams follow substantially the same optical paths, which can greatly simplify the holographic system 80. The object and reference beams exit spatial light modulator 85 and pass through beam splitter 84, before interfering in a holographic medium 87 to record a hologram. One or more optical elements 86 can be used to condition the object and reference beams so that the beams properly interfere in medium 87. Medium 87 may take the form of a disk or a card, or any other holographic media format. For example, medium 87 may have a sandwich construction in which a photosensitive material is sandwiched between two optically clear glass or plastic substrates.

Like the transmissive embodiments, the physical separation of the various components of system 80 may be dependent on focal lengths associated with optical elements 82 and 86. For example, a 4F configuration, or a wide variety of other optical arrangements, could also be used. In particular, optical arrangements could be defined so that the holograms comprise Fourier transform holograms, image plane holograms, Fresnel holograms, van de Lugt holograms, or any other type of holograms that can store the data encoded in the object beam by spatial light modulator 85.

In order to read stored holograms, spatial light modulator 85 is controlled to substantially block the light through the object path. In other words, the elements of spatial light modulator 85 which are used to create a data encoded object beam are made to be non-reflective in order to block substantially all light from the object path. Accordingly, in that case, only the reference beam exits spatial light modulator 85 to illuminate medium 87. When a stored hologram on medium 87 is illuminated by the reference beam only for that given hologram, a reconstruction of the data encoded object beam is created and can be detected by detector 89. For example, detector 89 may comprise a camera. One or more optical elements 88 may be used to condition the reconstructed object beam for proper illumination of the encoded pixel array onto detector 89.

Figure 9:
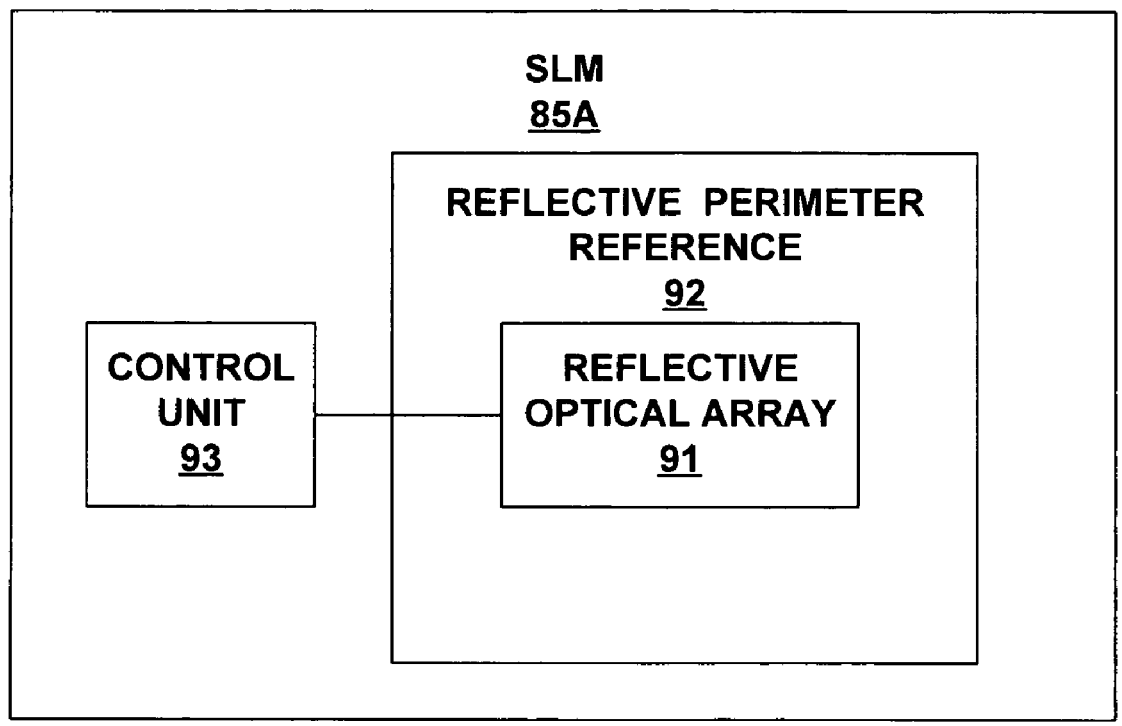
FIG. 9 is a block diagram of a spatial light modulator, which may correspond to the spatial light modulator illustrated in FIG. 8.

FIG. 9 is a block diagram of a spatial light modulator 85A, which may correspond to spatial light modulator 85 of FIG. 8. In this case, spatial light modulator 85A includes a reflective optical array 91, a reflective perimeter reference zone 92, and a control unit 93 to control the individual elements of reflective optical array 91. Reflective optical array 91 may include a set of controllable reflective optical elements to create a data encoded object beam from an interior portion of an input light source. Control unit 93 comprises a typical SLM controller and controls set of controllable reflective optical elements to define a desired pixel array to be stored as a hologram. Moreover, for readout of stored holograms, control unit 93 controls set of controllable reflective optical elements to block light through the object path so that only the reference beam exits spatial light modulator 85A.

Figure 10:
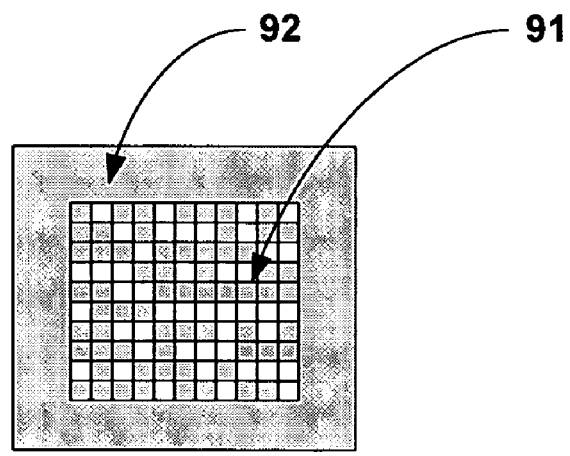
FIG. 10 is a simplified conceptual view of a reflective optical array and a reflective perimeter reference zone of the spatial light modulator illustrated in FIG. 9.

FIG. 10 is a simplified conceptual view of a reflective optical array 91 and a reflective perimeter reference zone 92. Again, reflective optical array 91 includes a set of controllable optical elements, which can be selectively controlled to pass or block light from the input light source in order to define a pixel array, which represents encoded data. By way of example, the pixel array may be a 1000×1000 bit array of pixels, although the invention could be applied with arrays of any size.

Perimeter reference zone 92 is positioned around the set of controllable optical elements of reflective optical array 91. Perimeter reference zone 92 creates a reference beam from a perimeter portion of the input light source. Perimeter reference zone 92 may comprise a fixed reflective reference mask that creates the reference beam, and may define a unique output that provides for data encryption in the stored holograms. In creating the reference beam, perimeter reference zone 92 may optically adjust one or more optical characteristics of the perimeter portion of the input light source, such as the pattern, the phase, and/or the polarization of the input light.

Perimeter reference zone 92 may comprise one or more fixed reflective optical elements. In other words, perimeter reference zone 92 comprises one or more non-controllable reflective elements that statically define the reference beam. For example, perimeter reference zone 92 may comprise a replicated specular structure, a coated specular structure or any other structure to optically reflect and define a reference beam having some type of signature. The signature of the reference beam must be substantially duplicated to facilitate readout. Such a perimeter reference zone 92 may be fabricated using mastering and stamping techniques such that numerous similar perimeter reference zones can be created the same for use in different holographic systems. In that case, holographic media may be read by different systems. Alternatively, the perimeter reference zone 92 may define a unique pattern such that only a particular system can read its holographic media. In that case, perimeter reference zone 92 can be viewed as a reflective mask that encodes the holograms for improved data security.

Like the transmissive embodiments, the use of a fixed or non-controllable perimeter reference zone 92 provides advantages in terms of reduced cost and simplicity in holographic recording system 90. Reflective optical array 91 may take advantage of more uniform light intensity of the central portion of a Gaussian light distribution, relative to the intensity on perimeter reference zone 92. The size of perimeter reference zone 92 relative to the size of reflective optical array 91 may be selected to achieve substantially equal intensities in the object and reference beams. For example, perimeter reference zone 92 may be larger in area than the set of controllable elements that make up reflective optical array 91 so that substantially equal intensities of light illuminate the perimeter reference zone and controllable interior portion when Gaussian light distribution illuminates spatial light modulator 85A.

Figure 11:
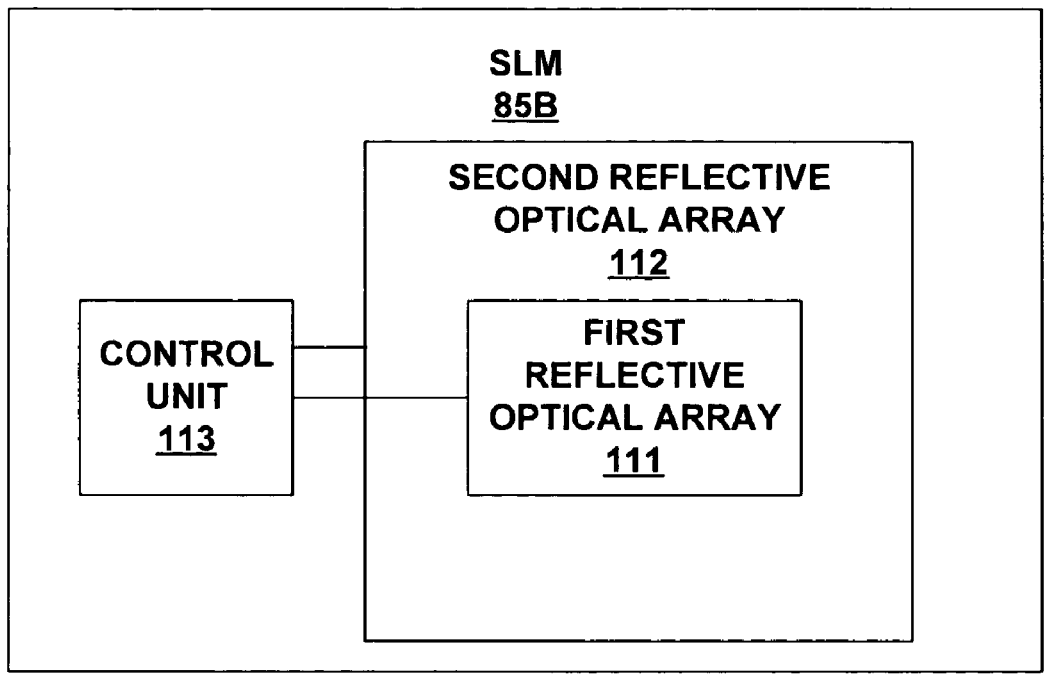
FIG. 11 is another block diagram of a spatial light modulator, which may correspond to the spatial light modulator illustrated in FIG. 8.

FIG. 11 is a block diagram of a spatial light modulator 85B, which may correspond to spatial light modulator 85 of FIG. 8. In this case, spatial light modulator 85B includes a first reflective optical array 111, a second reflective optical array 112, and a control unit 113 to control the individual elements of first and second reflective optical arrays 111, 112. First reflective optical array 111 includes a first set of controllable reflective optical elements to create a data encoded object beam from a first controllable portion of an input light source. Second reflective optical array 112 includes a second set of controllable reflective optical elements to create reference beam from a second controllable portion of an input light source. Control unit 113 comprises a typical SLM controller and controls sets of controllable reflective optical elements to define a desired pixel array to be stored as a hologram. In other words, control unit 113 controls both first and second reflective optical arrays 111, 112.

The first set of controllable reflective optical elements which form first reflective optical array 111 may form an interior portion of spatial light modulator 85B and the second set of controllable reflective optical elements which form second reflective optical array 112 may form a perimeter portion of spatial light modulator 85B. Alternatively, any respective portions of spatial light modulator 85B may be used to define the first and second reflective optical arrays 111, 112. For example, the position of first and second reflective optical arrays 111, 112 could be reversed, or the first and second reflective optical arrays 111, 112 could reside side-by-side. Again, however, using the interior portion for creating of the data encoded object beam may provide certain advantages in the creation of holograms because Gaussian light distribution results in more uniform light intensity in the interior portion. For readout of stored holograms, control unit 113 controls first and second reflective optical arrays 111, 112 to define a desired reference beam and to block light through the object path so that only the reference beam exits spatial light modulator 85B.

Figure 12:
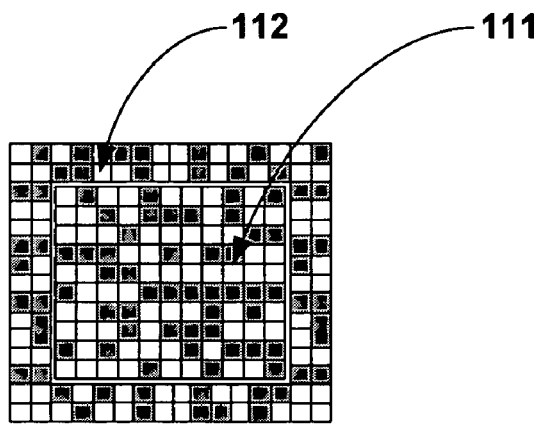
FIG. 12 is a simplified conceptual view of a first reflective optical array and a second reflective optical array of the spatial light modulator illustrated in FIG. 11.

FIG. 12 is a simplified conceptual view of a first reflective optical array 111 and a second reflective optical array 112. Both first and second reflective optical arrays are controllable. First reflective optical array 111 defines the data encoded object beam, and second reflective optical array 112 defines a reference beam. By controlling the reflective optical elements of first reflective optical array 111, a bit map can be defined, and by controlling the optical elements of second reflective optical array 112, a reference beam can be defined for the bit map. The pixel arrays for both the object and reference beams may include thousands or millions pixels, although the invention could be applied with arrays of any size. For simplicity, the illustrated arrays 111, 112 include a small subset of the thousands of millions of reflective elements that would be included in a real system.

In this example, the first set of controllable optical elements which form first reflective optical array 111, comprise an interior portion of spatial light modulator 85B, and the second set of controllable optical elements which form second reflective optical array 112 comprise a perimeter portion of spatial light modulator 85B. However, in other embodiments, any respective portions of spatial light modulator 85B may be used to define the first and second transmissive optical arrays 111, 112.

First reflective optical array 111 creates a data encoded object beam from a first portion of the input light source. In other words, the optical elements of first reflective optical array 111 are collectively defined such that some elements reflect light and other elements block light. In this manner, a pixel array or bit map is encoded in an object beam.

Second transmissive optical array 112 creates a reference beam from a second portion of the input light source. In other words, the optical elements of second reflective optical array 112 are collectively defined such that some elements reflect light and other elements block light. In this manner, a reference mask is encoded in the reference beam. Accordingly, different reference beams can be created for different object beams such that different holograms have different reference beams. This can improve the ability to multiplex holograms, and in some cases allows for two or more holograms to be recorded in substantially the same volume of a medium.

Readout of the different holograms would be performed by illumination of the medium with the various different reference beams at the locations where holograms are recorded. The reference beams of different holograms recording in a given volume of the medium may be substantially non-correlated. Substantial non-correlation between different reference beams helps multiplexing by ensuring that two or more holograms can be recorded in substantially the same volume of a medium. Other multiplexing techniques, however, could be used in conjunction with the creation of non-correlated reference beams, e.g., angle multiplexing techniques, shift multiplexing techniques, wavelength multiplexing techniques, or the like.

Figure 13:
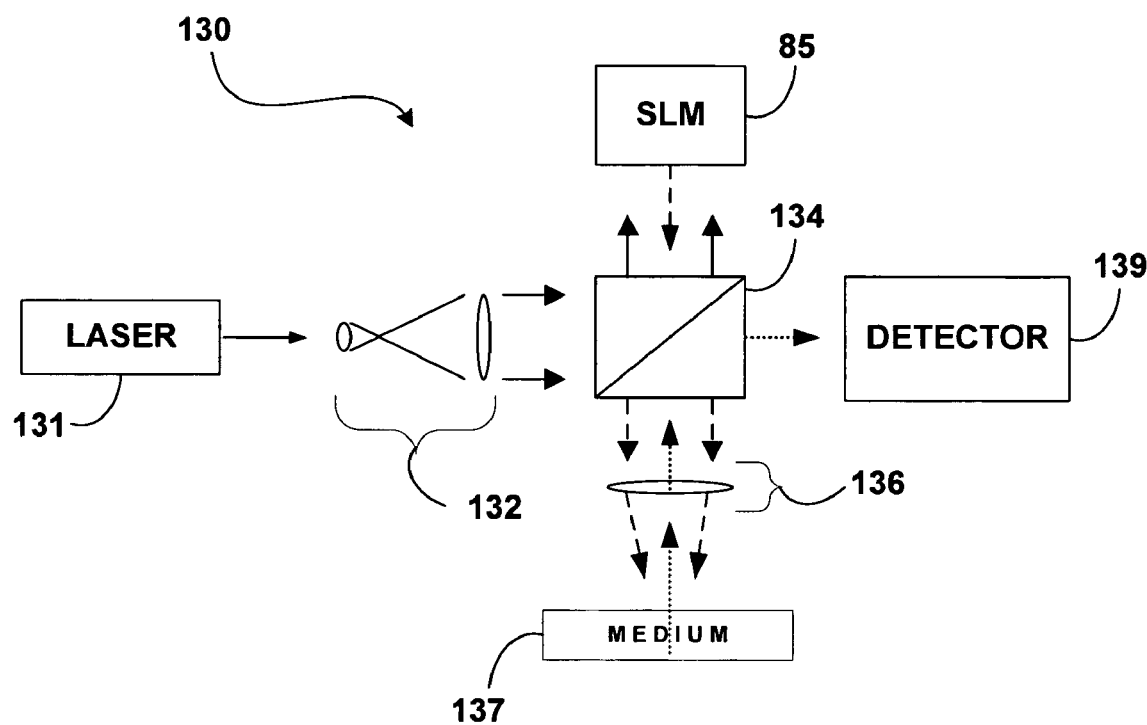
FIG. 13 illustrates another holographic system according to an embodiment of the invention that makes use of a reflective spatial light modulator to both encode data on the object beam and create a reference beam.

FIG. 13 illustrates another holographic system 130 according to an embodiment of the invention that makes use of a reflective spatial light modulator 85 to both encode data on the object beam and create a reference beam. Spatial light modulator 85 of FIG. 13 may correspond to either spatial light modulator 85A or spatial light modulator 85B described above with reference to FIGS. 9–12.

System 130 includes a laser 131 to provide an input light source to system 130. One or more optical elements 132 can be used to condition the light from laser 131 in order to illuminate spatial light modulator 85. Light from laser 131 and conditioned by elements 132 is reflected to spatial light modulator 85 by beam splitter 134.

In accordance with the invention, spatial light modulator 85 creates both a data encoded object beam and a reference beam from the input light. In particular, either of the distinct embodiments described herein may be used. In one case, spatial light modulator 85 includes a first set of controllable reflective optical elements to create a data encoded object beam from an input light source and a second set of controllable reflective optical elements to create a reference beam from the input light source. A control unit of spatial light modulator 85 can be used to control the first set of controllable optical elements in order to define a bit map in the data encoded object beam and to control the second set of controllable optical elements in order to define a reference mask in the reference beam.

In the other case, spatial light modulator 85 includes a set of controllable reflective optical elements to create a data encoded object beam from an interior portion of an input light source, and a reflective perimeter reference zone positioned around the set of controllable optical elements to create a reference beam from a perimeter portion of the input light source. In that case, the perimeter reference zone may comprise a fixed reflective reference mask that creates the reference beam.

In system 130, the object and reference beams follow substantially the same optical paths, which can greatly simplify holographic system 130 relative to conventional systems. The object and reference beams exit spatial light modulator 85 and pass through beam splitter 134 before interfering in a holographic medium 137 to record a hologram. One or more optical elements 136 can be used to condition the object and reference beams so that the beams properly interfere in medium 137. Medium 137 may take the form of a disk or a card, or any other holographic media format. For example, medium 137 may have a sandwich construction in which a photosensitive material is sandwiched between an optically clear substrate and an optically reflective substrate.

In this example, medium 137 is a reflective holographic medium. During readout, medium 137 is illuminated by the reference beam only. Spatial light modulator 85 can be controlled so that only the reference beam is transmitted to illuminate medium 137. The reference beam creates a reconstruction of the original data encoded object beam, which is reflected back through optical elements 136 and beam splitter 134. Detector 139, such as a camera, is positioned to detect the reconstructed bit map in the reconstructed object beam.

Like the other holographic systems described herein, the physical separation of the various components of system 130 may be dependent on focal lengths associated with optical elements 132 and 136. For example, a 4F configuration, or a wide variety of other optical arrangements, could also be used. In particular, optical arrangements could be defined so that the holograms comprise Fourier transform holograms, image plane holograms, Fresnel holograms, van de Lugt holograms, or any other type of holograms that can store the data encoded in the object beam by spatial light modulator 85.

In any case, spatial light modulator 85 facilitates creation of both the object and reference beams. In particular, different portions of spatial light modulator 85 are used to create the data encoded object beam and the reference beam, which are then made to interfere in a holographic medium to record a hologram. Accordingly, the object and reference beams follow substantially the same optical path, which can simplify the holographic recording system. In some cases, the reference beam is created by controllable reflective elements which provides more flexibility to system 130 in terms of creation of the different reference beams, and in other cases, the reference beam is created by a non-controllable perimeter reflective reference zone which adds simplicity to system 130 and may reduce production costs associated with system 130.

Various embodiments of the invention have been described. For example, techniques for creating both an object beam and a reference beam using a spatial light modulator have been described. Different portions of the spatial light modulator are used to create the data encoded object beam and the reference beam, which are then made to interfere in a holographic medium to record a hologram. Accordingly, the object and reference beams follow substantially the same optical path, which can simplify the holographic recording system.

In one embodiment, a transmissive spatial light modulator includes a first set of controllable transmissive optical elements to create a data encoded object beam from an input light source and a second set of controllable transmissive optical elements to create a reference beam from the input light source. In another embodiment, a reflective spatial light spatial light modulator includes a first set of controllable reflective optical elements to create a data encoded object beam from an input light source and a second set of controllable reflective optical elements to create a reference beam from the input light source. In another embodiment, a spatial light modulator includes a set of controllable transmissive optical elements to create a data encoded object beam from an interior portion of an input light source, and a perimeter transmissive reference zone positioned around the set of controllable transmissive optical elements to create a reference beam from a perimeter portion of the input light source. In another embodiment, a spatial light modulator includes a set of controllable reflective optical elements to create a data encoded object beam from an interior portion of an input light source, and a perimeter reflective reference zone positioned around the set of controllable reflective optical elements to create a reference beam from a perimeter portion of the input light source.

Yet another advantage of the techniques described herein is the ability to provide for improved detection of stored holograms. For example, if the reference beam and object beam are created from different portions of the spatial light modulator, the reference beam and object beam can be viewed as respective portions of an SLM plane within the spatial light modulator. When a hologram image is reconstructed at the detector plane, this hologram image will substantially replicate the image that was encoded at the SLM plane during prerequisite recording of the hologram. Therefore, reference beam light intensity will not coincide or overlap the reconstruction of the object beam in the detector plane. This can improve the ability to read holograms from holographic media by reducing or eliminating reference light contributions that might otherwise degrade the reconstructed object.

The reference beams described herein can define unique optical patterns. Adding such characteristics to a reference beam is sometimes referred to as adding phase selectivity in the reference beams. In particular, phase selectivity can be used to improve differentiation of overlapping holograms in a holographic recording medium. A phase mask in the reference beam, e.g., having a checkerboard-like configuration, can introduce desired phase content into the reference beam which can improve the ability to differentiate holograms of an overlapping series. Such "phase-correlation multiplexing" may be independent of Bragg selectivity techniques, which are sometimes used to facilitate multiplexing of holograms. In any case, introduction of phase selectivity, e.g., using either controllable reflective or transmissive elements, or a reflective or transmissive perimeter reference zone, may improve the system by enabling improved multiplexing selectivity, resulting in higher storage capacity in holographic media.

Still other characteristics of the reference beam may also be defined by either controllable reflective or transmissive elements, or a reflective or transmissive perimeter reference zone. Characteristics of the reference beam which can be defined include phase or amplitude of the beam or portions of the beam, polarization, or other characteristics. For example, if a desired polarization is needed, the controllable reflective or transmissive elements may include transmissive or reflective polarizers, or a reflective or transmissive perimeter reference zone may comprise transmissive or reflective polarizers.

In still other embodiments, the respective portions of the spatial light modulator used to create the object and reference beams could be located in different locations relative to one another. For example, first and second sets of controllable optical elements could be positioned so that the reference set of elements is in the interior rather than the perimeter, or the first and second sets of elements could be positioned side-by-side or in other locations relative to each other. If a non-controllable reference zone is used, it could also be in the interior rather than the perimeter. In that case, a technique may comprise optically directing the interior portion of the input light source with an interior reference zone positioned inside a set of controllable optical elements of the spatial light modulator. These and other embodiments are within the scope of the following claims.

The invention claimed is:

1. A spatial light modulator comprising:
a first set of controllable optical elements to create a data encoded object beam from a perimeter portion of an input light beam; and
a second set of controllable optical elements to create a reference beam from an interior portion of the input light beam.

2. The spatial light modulator of claim 1, wherein the second set of controllable optical elements are controlled to define a reference mask.

3. The spatial light modulator of claim 1, wherein the second set of controllable optical elements optically adjusts one or more optical characteristics of the interior portion of the input light beam.

4. The spatial light modulator of claim 1, wherein the second set of controllable optical elements optically adjusts a phase of the interior portion of the input light beam.

5. The spatial light modulator of claim 1, wherein the second set of controllable optical elements optically adjusts a polarization of the interior portion of the input light beam.

6. The spatial light modulator of claim 1, wherein the first and second sets of controllable optical elements include transmissive optical elements.

7. The spatial light modulator of claim 1, wherein the first and second sets of controllable optical elements include reflective optical elements.

8. The spatial light modulator of claim 1, further comprising a control unit to control the first and second sets of controllable optical elements.

9. A method comprising:
creating a data encoded object beam from a perimeter portion of an input light beam using a first set of controllable optical elements of a spatial light modulator; and
creating a reference beam from an interior portion of the input light beam using a second set of controllable optical elements of the spatial light modulator.

10. A holographic data storage system comprising:
a holographic medium; and
a spatial light modulator including a first set of controllable optical elements to create a data encoded object beam from a perimeter portion of an input light beam, and a second set of controllable optical elements to create a reference beam from an interior portion of the input light beam, wherein the data encoded object beam and reference beam interfere in the holographic medium to create a hologram.

11. The system of claim 10, wherein the second set of controllable optical elements are controlled to define a reference mask.

12. The system of claim 10, wherein the second set of controllable optical elements optically adjusts one or more optical characteristics of the interior portion of the input light beam.

13. The system of claim 10, wherein the second set of controllable optical elements optically adjusts a phase of the interior portion of the input light beam.

14. The system of claim 10, wherein the second set of controllable optical elements optically adjusts a polarization of the interior portion of the input light beam.

15. The system of claim 10, wherein the first and second sets of controllable optical elements include transmissive optical elements.

16. The system of claim 10, wherein the first and second sets of controllable optical elements include reflective optical elements.

17. The system of claim 10, further comprising a control unit to control the first and second sets of controllable optical elements.

* * * * *